No. 608,852. Patented Aug. 9, 1898.
J. H. GOSS.
RIGHT ANGLE SWIVEL CONNECTION.
(Application filed Jan. 24, 1898.)
(No Model.)
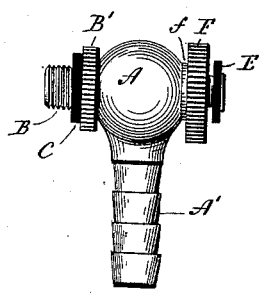
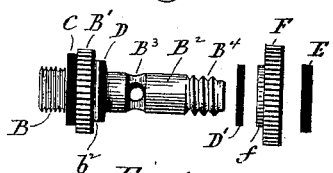
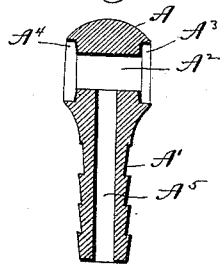
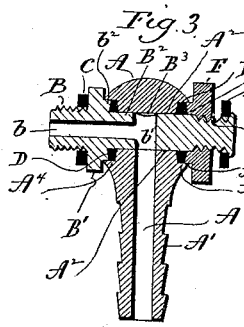
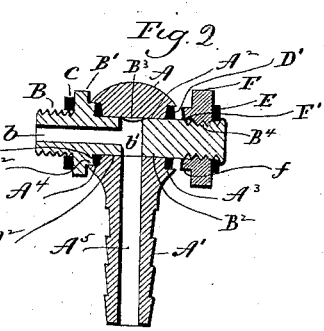

UNITED STATES PATENT OFFICE.

JOHN H. GOSS, OF WATERBURY, CONNECTICUT, ASSIGNOR TO THE SCOVILL MANUFACTURING COMPANY, OF SAME PLACE.

RIGHT-ANGLE SWIVEL CONNECTION.

SPECIFICATION forming part of Letters Patent No. 608,852, dated August 9, 1898.

Application filed January 24, 1898. Serial No. 667,717. (No model.)

*To all whom it may concern:*

Be it known that I, JOHN H. GOSS, of Waterbury, in the county of New Haven and State of Connecticut, have invented a new Improvement in Right-Angle Swivel Connections; and I do hereby declare the following, when taken in connection with the accompanying drawings and the letters of reference marked thereon, to be a full, clear, and exact description of the same, and which said drawings constitute part of this specification, and represent, in—

Figure 1, a view in elevation of my device; Fig. 2, a view thereof in central longitudinal section with the operating-nut frictionally coupled with the stem of the coupling-nut for the rotation thereof; Fig. 3, a similar view with the operating-nut turned inward for drawing the parts of the device together, so as to make it air-tight; Fig. 4, a detached view, in longitudinal section, of the coupling-head, showing the sockets formed in the opposite faces thereof; Fig. 5, a view showing the coupling-nut, the operating-nut, the friction-washer, and the packing-washers.

My invention relates to an improvement in that class of swivel connections primarily designed for use in conjunction with the transmission-tubes of those air-pumps employed for inflating pneumatic bicycle-tires, the object being to produce a simple and effective device constructed with particular reference to convenience of use by having its coupling-nut and the parts acting in conjunction therewith arranged at a right angle to the coupling-head, and therefore at a right angle to the line of the transmission-tube, which is attached to the shank of the said head. On account of this peculiarity of my device I shall hereinafter call it a "right-angle swivel connection."

With these ends in view my invention consists in a right-angle swivel connection having certain details of construction, as will be hereinafter described, and pointed out in the claims.

In carrying out my invention I employ a coupling-head A, having a corrugated coupling-shank $A'$, which is adapted for the attachment to it in the ordinary manner of the transmission-tube of a pump. The said head is formed with a diametric passage $A^2$, which extends through it at a right angle to the line of its shank $A'$ and terminates at its ends in annular packing-receiving recesses $A^3$ and $A^4$. The shank $A'$ of the head is formed with a longitudinal air-passage $A^5$, which at its inner end intersects the passage $A^2$ aforesaid. In conjunction with this coupling-head I employ a coupling-nut B, which is externally threaded and adapted to be inserted into the valve of a bicycle-tire, the said nut being encircled at its base by a packing-washer C, which is placed against the outer face of a knurled annular flange $B'$, formed at the base of the said nut. The said nut is furnished with an integral cylindrical stem $B^2$, having a circumferential groove $B^3$ located about midway of its length and forming an air-passage and having its extreme outer end threaded, as at $B^4$. An air-passage $b$, formed in the nut B, extends inward into the stem thereof, where it meets a transverse hole $b'$, extending inward into the stem from the bottom of the circumferential groove $B^3$. Upon the inner face of the knurled annular flange $B'$, I form an annular shoulder $b^2$, adapted in diameter to fit closely within the annular packing-recess $A^4$ of the coupling-head, the said shoulder $b^2$ being designed to place under pressure and confine a packing-washer D, located in the bottom of the said recess. The outer end of the stem $B^2$ projects beyond the opposite face of the coupling-head $A'$ and is furnished at its extremity with a washer E, which is rigidly secured in place and which prevents the operating-nut F from being detached from the said stem. The said operating-nut F is interposed between the washer E and the recess $A^3$ and mounted upon the said threaded portion $B^4$ of the stem. It is formed upon its inner face with an annular shoulder $f$, adapted in diameter to closely fit within the annular packing-receiving recess $A^3$ and confines and places under pressure an annular packing-washer $D'$, located in the bottom of the said recess. The inner face of the said nut F is counterbored, as at $F'$, to receive the unthreaded outer portion of the stem $B^2$, which is left unthreaded up to a point very near its outer extremity in order that its threads may not encroach upon the packing-washer D', and so give a chance for leakage. I wish also to call attention to the fact that the threads of the operating-nut are much finer in pitch than the threads $B^4$ upon the outer end of the stem of the operating-nut. The object of this difference in pitch of the threads will be explained later on.

In using the device the operating-nut F is turned so as to run it outward on the threads $B^4$ of the stem $B^2$ until its outer face is jammed against the inner face of the washer E with such force that a friction-coupling is established between the threads of the said operating-nut and the threads $B^4$ of the stem of the coupling-nut as well as between the inner face of the washer and the outer face of the operating-nut. The coupling-nut is then entered into the valve of the tire to be inflated and screwed thereinto through the medium of the operating-nut F and the stem $B^2$, which act as one piece as long as the operating-nut remains frictionally coupled with the stem, as described. Although the coupling between the operating-nut and the stem is only a friction-coupling, it will be found sufficient in power to permit the coupling-nut to be screwed into the valve by the operating-nut, for the reason that the threads of the coupling-nut are finer in pitch than the threads $B^4$ of the stem and the coacting threads of the operating-nut. After the coupling-nut has been entered into the valve, as required, it will tighten against the top of the valve and offer more resistance to turning than is represented by the friction coupling the operating-nut with the stem of the coupling-nut. When this point is reached, the operating-nut will release and turn upon the stem and travel inward thereupon with the effect of engaging its shoulder $f$ with the packing-washer D', which will then be placed under pressure. This pressure will then be communicated through the stem of the operating-nut and the shoulder $b^2$ to the packing-washer D, which will also be placed under pressure. In this manner the shoulders of the operating-nut and of the coupling-nut will be drawn toward each other with the effect of compressing both of the washers which pack the stem, whereby the chance of leakage is reduced to the minimum. It will thus be seen that after the operating-nut has been employed for turning the coupling-nut into the valve it is then employed for tightening up the parts of the device, so as to impose enough pressure upon the packing-washers thereof to make the device perfectly air-tight at the time the compressed air is forced through the device into the tire.

In removing the device from the valve the operating-nut is first released on account of the described differentiation in the screw-threads and travels outward on the threaded end of the coupling-stem until it jams against the washer, after which it becomes bound upon the stem, which is then turned by it for unscrewing the coupling-nut from the valve.

I would have it understood that I do not limit myself to the exact construction herein set forth, but hold myself at liberty to make such changes and alterations as fairly fall within the spirit and scope of my invention.

Having fully described my invention, what I claim as new, and desire to secure by Letters Patent, is—

1. A right-angle swivel connection having a coupling-head furnished with a shank, and having a diametric passage formed in it at a right angle to the said shank, a coupling-nut formed with a stem which extends through the said passage, and projects beyond the said head, an operating-nut mounted upon the projecting end of the stem which is threaded for the purpose, and a washer rigidly secured to the extreme outer end of the stem and coacting with the said operating-nut.

2. A right-angle swivel connection comprising a coupling-head having a shank, and formed with a diametric passage arranged at a right angle to the said shank, and terminating at its ends in packing-receiving recesses located in the opposite sides of the said head, an operating-nut formed with an inwardly-projecting, annular shoulder extending into one of the said recesses, and with a stem which extends through the passage in the head and projects beyond the other end thereof, an operating-nut mounted upon the projecting end of the stem which is threaded for the purpose and provided with an inwardly-projecting annular shoulder which extends into the other packing-receiving recess, packing-washers located in the bottoms of the said recesses, and confined and placed under pressure by the said shoulders, and a washer secured to the extreme outer end of the said stem, and preventing the operating-nut from being detached therefrom.

In testimony whereof I have signed this specification in the presence of two subscribing witnesses.

JNO. H. GOSS.

Witnesses:
C. M. DE MOTT,
E. O. GOSS.